Oct. 7, 1924.
P. L. SCOTT
METERING VALVE
Filed Dec. 15, 1919
1,510,802
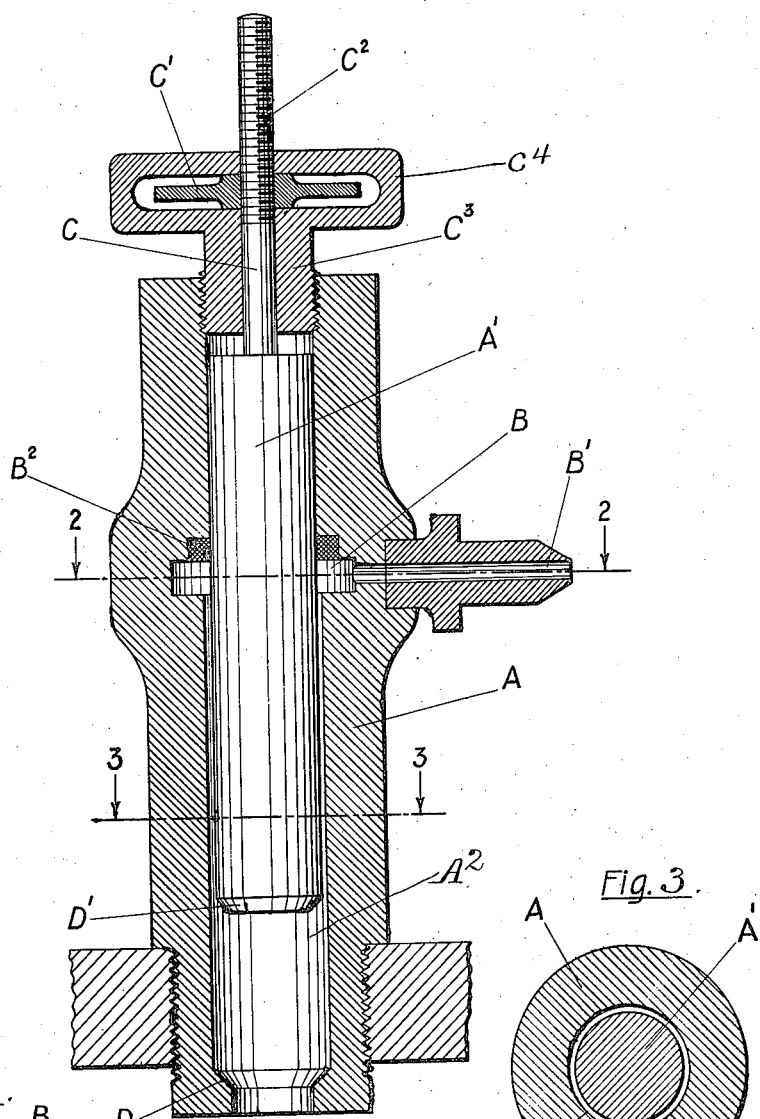
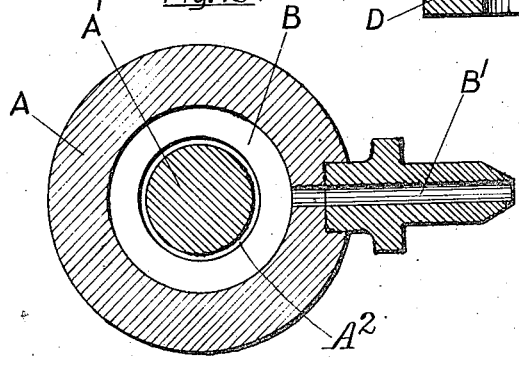
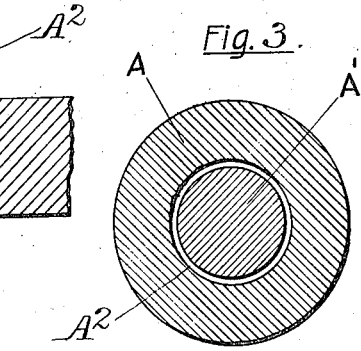
INVENTOR
Philip L. Scott.
BY
ATTORNEYS
Witness:

Patented Oct. 7, 1924.

1,510,802

UNITED STATES PATENT OFFICE.

PHILIP LANE SCOTT, OF THREE OAKS, MICHIGAN, ASSIGNOR TO SUPER-DIESEL TRACTOR CORPORATION, OF LAPORTE, INDIANA, A CORPORATION OF NEW YORK.

METERING VALVE.

Application filed December 15, 1919. Serial No. 344,884.

*To all whom it may concern:*

Be it known that I, PHILIP L. SCOTT, a citizen of the United States, residing at Three Oaks, in the county of Berrian and State of Michigan, have invented a certain new and useful Improvement in Metering Valves, of which the following is a specification.

In control valves of the prior art, it has been common to use needle valves for adjustment, resulting in questionable accuracy. When the taper of the needle and seat is blunt, a slight turn of the adjusting screw makes a large difference in adjustment, and an exact regulation is difficult or impossible. Where the taper is more gradual, the valve is expensive to make, the needle is weak, and subject to deflection and even so, the gain in accuracy is relatively slight. I have determined that in a passage of small, cross section, but of large wall area, if the cross section is sufficiently small in relation to the wall area, the frictional resistance to the passage of liquid becomes so high as to vary the amount of liquid flowing through in direct ratio to the length of the passage. Therefore, I take a plunger, and fit it so exactly into a cylinder, as to provide between the outer surface of the plunger and the inner surface of the wall of the cylinder an annular passage of relatively small cross sectional area. The cross section of the passage being uniform, the rate of flow therethrough is increased or diminished by a motion of the plunger, which increases or diminishes the length of the restricted portion.

My invention therefore relates to valves for controlling the flow of liquid, and more particularly to valves, for regulating and adjusting the feed of motive fluid to the cylinders of internal combustion engines. One object is to provide an adjustable feed valve which shall be cheap and easy to construct, and susceptible of easy and very accurate adjustment, and which shall be durable and not lose its accuracy.

I have illustrated my invention more or less diagrammatically in the following figures wherein—

Fig. 1 is a longitudinal cross section of my control valve;

Fig. 2 is a section on the line 2—2 of Fig. 1;

Fig. 3 is a section on the line 3—3 of Fig. 1;

Like parts are indicated by like letters in all the figures.

A is a substantially cylindrical valve housing having a cylindrical bore. $A^1$ is a valve plunger of uniform diameter mounted for adjustable movement in said housing and of such a size as to fit and leave but a very slight clearance between it and the inner surface of the wall of the housing or seat $A^2$, the distance separating the seat and the surface of the plunger being for example, somewhere in the neighborhood of 1/1000 of an inch and upwards, depending on the viscosity of the fluid and diameter of the cylindrical bore. About one end of the valve plunger is the annular passage B to which the fluid is fed under pressure from the passage $B^1$. One side of the annular passage, where the plunger passes through it, is made tight against the passage of the liquid by a packing ring $B^2$ or other suitable means.

C is a valve stem projecting upwardly from the plunger $A^1$. It is screw-threaded at $C^2$ and engaged by the hand wheel $C^1$ held in position against longitudinal movement by the yoke $C^4$ on the screw-threaded plug $C^3$ so that manipulation of the hand wheel may cause longitudinal adjusting movement of the plunger.

D is a beveled cut off valve seat at the lower end of the metering valve seat $A^2$ adapted to be engaged by the lower end of the plunger to make a positive closure, and to completely stop the flow of fluid through the metering portion of the valve.

It will be evident that while I have shown in my drawings an operative device, still many changes might be made in size, shape and arrangement of parts without departing materially from the spirit of my invention.

It will be noted that there is always friction when a fluid or a liquid passes through a pipe, and that there will always be eddy currents where the fluid or liquid changes direction or passes from a large pipe to a small one, or vice versa. The point is that by my arrangement, the controlled friction where the metering is done, is so exceedingly great with respect to the constant friction of the pipe or to any eddy currents, that the effect of the eddy currents and of the frictional resistance of the balance of the system is negligible as compared to the controlled metering friction. If I change the size or shape of any of the associated parts and leave the metering portion of the apparatus as it is, I will not be able to measure the difference. There may even be a certain amount of eddy current or eddying where the metering frictional force is applied, but owing to the thinness of the film, this is so small as to be only theoretical and not subject to discovery or measuring.

The frictional resistance varies in a constant ratio and, if frictional resistance is varied, the flow is accurately metered.

There are in this metering valve two seats, one may be called the metering seat and comprises the entire wall of the space within the cylinder and below the annular passage B. The second is the cut off seat at the bottom of the cylinder upon which the end of the plunger is seated when it is desired completely to close the valve. Where a cylindrical seat is mentioned in the specifications or claims, such seat is the entire wall of the bore, below the annular passage B, that is, it is the first type of seat.

When fluid passes over a surface there is bound to be friction between the fluid and the surface over which it passes. This friction is called "skin friction." The importance of skin friction is generally increased as the size of the passage through which the fluid moves is decreased. In my invention skin friction is of importance, and where in the specification and claims I use that expression I means that friction which occurs due to the passage of the fluid over the surfaces within the fluid passages of the valve.

The use and operation of my invention are as follows:—

When the valve is positively closed, the lower end of the plunger rests against the shut-off valve seat and no flow of any kind takes place.

When it is desired to permit flow through the valve, the hand wheel is manipulated to raise the plunger. As soon as the plunger leaves the shut-off seat, flow of the liquid takes place. This flow starts as soon at least as the clearance between the plunger and the shut-off seat is equal to the clearance between the plunger and the metering seat but such flow will be relatively small if the metering portion of the valve seat is very long.

The further manipulation of the hand wheel tending to move the plunger longitudinally will shorten the effective length of the metering valve seat and as above pointed out, the flow of fluid will vary directly as the variation in the length of the metering seat so that the operator can positively control the flow of the fluid by positioning the plunger with the utmost nicety by means of the screw-threaded adjustment.

It is understood, of course, that this device is primarily intended for use in the feeding and metering of liquids under relatively high pressure but the pressure may be varied under certain conditions and be compensated for by slight variations in the proportions of the parts. It will be also understood that for liquids or oils of varying viscosity, varying clearances may be necessary and such clearances can be worked out to fit the operating conditions of pressure, viscosity and temperature in the ordinary manner.

I have used the term "seat" as applied to the inner side of the cylinder wall of the housing because this is the term generally used in the art even where there is an oil film between the plunger and its seat and that is really the situation here. It is a seat in that sense though of course, it is never expected that the plunger will touch the inner side of the wall or housing owing to the fact that there is an annular channel or passage.

In the drawings I have shown a considerable clearance between the plunger and the bore within which it is located. This clearance is greatly exaggerated for the purpose of illustration. In actual practice it is in the neighborhood of only a few thousandths of an inch.

I claim:—

1. The process of metering fluids which consists in passing them through a passage of very small cross-sectional area in proportion to the wall area and in varying the length of such passage to control the rate of flow, by the resistance of the fluid to shearing and separation by skin friction and resistance to internal shear.

2. A metering valve comprising a passage having a very small cross-sectional area in proportion to the wall area thereof, and means for adjusting the length of such passage to control the flow of fluid therethrough, by the resistance of the fluid to shearing and separation by skin friction and resistance to internal shear.

3. A metering valve comprising a very narrow annular passage having a very large wall area in proportion to its cross section and means for adjusting the length of such passage to control the flow of fluid therethrough, by the resistance of the fluid to shearing and separation by skin friction and resistance to internal shear.

4. A metering valve comprising a housing forming a cylindrical bore, a plunger mounted for longitudinal movement therein, the clearance between the plunger and the wall of the housing being such that the passage of liquid between the plunger and the wall is resisted mainly by skin friction and resistance to internal shearing of the liquid, means for introducing fluid into the cylindrical bore at one end about the plunger and discharging it at the other, means for positioning the plunger in said bore in the path of the fluid to vary the flow of the fluid through the housing by varying the length of the throttling passage due to variation in the position of the plunger.

5. A metering valve comprising a housing having a cylindrical bore, a plunger mounted for longitudinal movement therein, the clearance between the plunger and the wall of the housing being such that the passage of liquid between the plunger and the wall is resisted mainly by skin friction and resistance to internal shearing of the liquid, means for introducing fluid into the cylindrical bore at one end about the plunger and discharging it at the other, means for positioning the plunger to vary the length of the annular passage formed between the wall of the housing and plunger to control the rate of flow of the fluid by varying the length of the throttling passage due to variation in the position of the plunger.

6. The process of metering liquids, which consists in passing said liquid through a passage of variable length and of such width that the movement of the liquid therethrough is primarily resisted by skin friction and resistance to internal shear.

7. The combination with a valve housing having a cylindrical valve seat comprising the interior wall of the valve housing means slightly spaced from and cooperating with the valve seat and adjustable in position to meter the flow of fluid passed longitudinally therealong and means associated with the metering means for positively cutting off the flow of the fluid.

8. The combination with a valve housing having a cylindrical valve seat comprising the interior wall of the valve housing, means slightly spaced from and cooperating with the valve seat and adjustable in position to meter the flow of such fluid and means associated with the metering means for positively cutting off the flow of the fluid, said cut-off means comprising a cut-off valve seat at the end of the metering valve seat adapted to be engaged by the metering means.

9. The process of metering a fluid which consists in passing it through a channel, in which its passage is resisted by friction only, and varying the amount of such frictional resistance to control the rate of flow.

10. The process of metering a fluid which consists in passing it through a channel, in which its passage is resisted by friction only, such resistance being uniform throughout the length of the channel, and in varying the effective length of such channel to vary the total amount of frictional resistance to control the rate of flow.

11. The process of metering a fluid which consists in passing it through a channel, in which its passage is resisted by friction only, the column of fluid being of uniform cross sectional area where it is subjected to such frictional resistance and varying the amount of such frictional resistance to control the rate of flow.

12. The process of metering a fluid which consists in passing it through a channel, in which its passage is resisted by friction only, the column of fluid being of uniform cross sectional area where it is subjected to such frictional resistance and varying the distance through which the column of fluid travels while subject to such frictional resistance to vary the amount thereof and control the rate of flow.

13. The process of metering a fluid which consists in resisting its movement by skin friction and in varying the volume of the liquid in relation to the surface of the liquid exposed to skin friction to control the rate of flow.

14. The combination with a smooth cylindrical valve seat of means opposed to and adjustable in position with respect to the valve seat for metering the flow of the fluid therealong, and means for positively arresting the flow of fluid therealong.

15. The combination with a smooth cylindrical valve seat of means opposed to and adjustable in position with respect to the valve seat for metering the flow of the fluid therealong, and means for positively arresting the flow of fluid therealong, said latter means being associated with the metering means and adapted to come into operation as the result of the final movement of the metering means.

In testimony whereof, I affix my signature in the presence of two witnesses this eighth day of December, 1919.

PHILIP LANE SCOTT.

Witnesses:
  EDITH L. PORTER,
  EDNA B. PETERSON.